US012559992B2

(12) United States Patent
Häger

(10) Patent No.: US 12,559,992 B2
(45) Date of Patent: Feb. 24, 2026

(54) MODULE MOUNTING SYSTEM ELEMENT FOR MOUNTING ON A MOTOR VEHICLE DOOR

(71) Applicant: Brose Schließsysteme Gmbh & Co. Kommanditgesellschaft, Wuppertal (DE)

(72) Inventor: Ole Häger, Wuppertal (DE)

(73) Assignee: Brose Schließsysteme Gmbh & Co. Kommanditgesellschaft (DE)

( * ) Notice: Subject to any disclaimer, the term of this patent is extended or adjusted under 35 U.S.C. 154(b) by 108 days.

(21) Appl. No.: 17/626,915

(22) PCT Filed: Jul. 14, 2020

(86) PCT No.: PCT/EP2020/069890
§ 371 (c)(1),
(2) Date: Jan. 13, 2022

(87) PCT Pub. No.: WO2021/009172
PCT Pub. Date: Jan. 21, 2021

(65) Prior Publication Data
US 2022/0356737 A1 Nov. 10, 2022

(30) Foreign Application Priority Data

Jul. 15, 2019 (DE) ..................... 10 2019 119 077.0

(51) Int. Cl.
*E05B 79/06* (2014.01)
*B60J 5/04* (2006.01)
(52) U.S. Cl.
CPC ............. *E05B 79/06* (2013.01); *B60J 5/0468* (2013.01)

(58) Field of Classification Search
CPC .......... E05B 79/06; E05B 81/76; E05B 81/77; E05B 81/78; E05B 85/10; E05B 85/14; E05B 85/16; E05B 85/18
(Continued)

(56) References Cited

U.S. PATENT DOCUMENTS

| | | | | |
|---|---|---|---|---|
| 6,401,302 B1 * | 6/2002 | Josserand | ............... | E05B 79/06 |
| | | | | 292/336.3 |
| 7,140,653 B2 * | 11/2006 | Kobayashi | .............. | E05B 85/16 |
| | | | | 292/336.3 |

(Continued)

FOREIGN PATENT DOCUMENTS

| | | |
|---|---|---|
| DE | 102011012687 A1 | 9/2012 |
| DE | 102016009825 A1 | 2/2018 |

(Continued)

*Primary Examiner* — Kristina R Fulton
*Assistant Examiner* — Noah Horowitz
(74) *Attorney, Agent, or Firm* — Dickinson Wright PLLC

(57) ABSTRACT

A mounting module for mounting on a motor vehicle door, including a functional component, the mounting module having a mounting module carrier and a body functional component fastened to the mounting module carrier. The mounting module including a mechanical interface for fastening an extension functional component, such as a handle part or handle mount of a door handle unit, a motor vehicle lock and/or a sensor device. The mounting module including a contact unit for electrically contacting the extension functional component, and, within the scope of the mounting of the extension functional component to the mounting module by means of a mounting movement introduced into the extension functional component, the extension functional component is fastened to the mounting module via the mechanical interface and the extension functional component is electrically contacted via the contact unit.

21 Claims, 4 Drawing Sheets

(58)  Field of Classification Search
USPC ............................................. 340/5.72, 425.5
See application file for complete search history.

(56)                         References Cited

U.S. PATENT DOCUMENTS

| | | | | |
|---|---|---|---|---|
| 8,959,964 | B2 * | 2/2015 | Hidaka ................... | E05B 85/16 |
| | | | | 292/DIG. 31 |
| 9,644,394 | B2 * | 5/2017 | Breimayer .............. | E05B 85/16 |
| 10,501,966 | B2 * | 12/2019 | Nagata ................... | E05B 81/56 |
| 11,274,475 | B2 * | 3/2022 | Beck ....................... | E05B 85/06 |
| 2015/0337571 | A1 * | 11/2015 | Henderson ............... | G07C 9/37 |
| | | | | 292/195 |
| 2019/0352942 | A1 * | 11/2019 | Put .......................... | E05B 85/16 |
| 2019/0352943 | A1 * | 11/2019 | Put .......................... | E05B 79/06 |
| 2019/0352944 | A1 * | 11/2019 | Put .......................... | E05B 85/06 |

FOREIGN PATENT DOCUMENTS

| | | | |
|---|---|---|---|
| DE | 102017210115 | A1 | 12/2018 |
| EP | 1108835 | A2 | 6/2001 |
| EP | 1255004 | A2 | 11/2002 |

* cited by examiner

A:

MODULE MOUNTING SYSTEM ELEMENT FOR MOUNTING ON A MOTOR VEHICLE DOOR

CROSS-REFERENCE TO RELATED APPLICATIONS

This application is the U.S. National Phase of PCT Application No. PCT/EP2020/069890 filed on Jul. 14, 2020, which claims priority to German Patent Application No. DE 10 2019 119 077.0, filed on Jul. 15, 2019, the disclosures of which are hereby incorporated in their entirety by reference herein.

TECHNICAL FIELD

The present disclosure relates to a mounting module for mounting on a motor vehicle door.

BACKGROUND

The term "motor vehicle door" comprises side doors, rear doors, trunk lids, tailgates, engine hoods, or the like, but also sliding doors which are displaceable along an outer face of the motor vehicle. In this regard, this term is to be understood broadly in the present case.

Mounting modules which may have different pre-mounted functional components, hereinafter called body functional components, are known from the prior art. Further functional components, hereinafter called extension functional components, may be fastened to such a mounting module. Functional components serve for implementing at least some of the functions of a motor vehicle door, wherein an extension functional component uses, in particular, electrical energy therefor. A pre-mounted unit with a mounting module carrier and one or more functional components fastened thereto, the body functional components, is denoted in this case as the mounting module, also denoted as the "mini module" or as the "multifunction bracket". A mounting module generally has a motor vehicle lock as a body functional component, and optionally a window guide rail as at least one further body functional component.

SUMMARY

The object of the invention is to design and to develop the known mounting module such that the efficiency is further increased during the manufacture of the assigned motor vehicle door.

According to one or more embodiments, the present disclosure describes a mounting module which permits an extension functional component, i.e. a functional component which may be connected to the mounting module in one step, such as with a single mounting movement, even after the mounting module has been mounted on the motor vehicle door, both to be fastened to the mounting module and also to produce an electrical connection between the extension functional component and mounting module. In this case, the fastening of the extension functional component to the mounting module, which at the same time leads to the electrical contacting, such as a fastening of the extension functional component in an intended final position, i.e. in the position which it is intended to adopt upon completion of the motor vehicle door. The performing of such a final fastening is also denoted hereinafter as the fixing. The extension functional component then adopts a final mounted state.

As an example, however, it is also conceivable that the mounting movement with which the extension functional component is fastened to the mounting module and at the same time electrically contacted, does not yet represent the final fastening and, for example, is a loose fastening. In this case, the electrical contacting is then, in particular, a pre-contacting. This may have the advantage that a permanent electrical contact is ensured within a movement clearance or with a tolerance compensation. Thus the mounting module may be tested, for example, before its final fixing to the motor vehicle door. If the extension functional component is then finally fastened to the mounting module, the electrical contacting may be brought thereby into its intended final state. This final state of the electrical contacting is the state in which the electrical contacting is completed, i.e. the electrical contacting after completion of the motor vehicle door.

Since in the proposed solution the extension functional component is electrically contacted automatically via the mounting module, the efficiency in the manufacture of the assigned motor vehicle door is further increased. Thus in this case a separate mounting step is no longer required for the contact, specifically for the connection of an electrical cable to the extension functional component and the mounting module. Moreover, an electrical cable does not have to be passed through the mounting module carrier and the cable bushing does not have to be correspondingly sealed, which may be advantageous when the mounting module carrier forms a wet-dry space separation in the motor vehicle door, or is a part thereof.

In one or more embodiments, the mounting module includes a mechanical interface for fastening an extension functional component, such as a handle part of a door handle unit and/or a handle mount of a door handle unit and/or a motor vehicle lock and/or a sensor device, and the mounting module has a contact unit for electrically contacting the respective extension functional component and that within the scope of the mounting of the extension functional component to the mounting module, by means of a mounting movement introduced into the extension functional component, the extension functional component is fastened to the mounting module via the mechanical interface and the extension functional component is also electrically contacted via the contact unit.

According to another embodiment, the handle mount of the door handle unit may be already provided on the mounting module in order to fasten thereto the extension functional component, preferably the handle part of the door handle unit. Correspondingly, the handle mount provides the mechanical interface and, as an example, also the contact unit. As an example, the handle mount of the door handle unit is a body functional component, i.e. a functional component which may be connected to the mounting module carrier even before the mounting module of a motor vehicle door is mounted.

In principle, however, the mounting module carrier itself may also provide the mechanical interface and correspondingly the extension functional component may be formed by the handle mount. In this case, the contact unit is provided on the mounting module carrier and the handle mount represents the functional component to be contacted electrically via the contact unit. The functional component to be electrically contacted, however, may also be a further extension functional component, for example the motor vehicle lock and/or a sensor device, or the like.

In one or more embodiments, the process of electrical contacting in which, electrical contacts of the extension functional component are brought together with electrical contacts of the contact unit, is provided. A mounting movement may be introduced into the extension functional component, which initially generates a pre-contacting, and then a further mounting movement is introduced into the extension functional component which generates the intended final state of the contacting. Alternatively or additionally, however, only a single mounting movement may be provided, by which firstly the fastening and, in particular, the fixing of the extension functional component is carried out on the mounting module, and secondly the intended final state is generated from a non-contacted state. In the last case, therefore, the fastening and electrical contacting takes place in one step.

According to another embodiment, a sealing element may be provided, the seal preferably during the course of fastening the extension functional component to the mounting module generating a seal of the contacting region, i.e. the region in which the electrical contacts of the extension functional component and the electrical contacts of the contact unit are brought together by the mounting movement.

In one or more embodiments, the mounting movement which is introduced into the extension functional component, in order to generate the contacting, at the same time the extension functional component is fixed on the mounting module in its intended final position. As an example, by this mounting movement the extension functional component and/or the mounting module are also fixed in the respective intended final position on the motor vehicle door.

In one or more embodiments, the mounting of the door handle unit on the motor vehicle door is provided. By way of example, the mounting of the door handle unit such as the handle part is used in order to describe the proposed solution in more detail. The handle part which may have a handle portion which may be gripped by the user, and in the final mounted state, may protrude or may be extended relative to the outwardly facing side of the door outer skin, is described as the extension functional component. The extension functional component is a handle part with at least one integrated electrical component, for example lighting, a sensor or the like, and the electrical components may be connected to one or more of the electrical contacts of the handle part. The handle part may be a fixed handle part which in the final mounted state is immovable and, as an example, permits an actuation purely by sensor. If an approach of the user to the handle portion or a pressure exerted by the user on the handle portion is detected by means of a sensor, a motor vehicle lock is opened as a result, whereby the motor vehicle door is able to be moved into an open position. Alternatively or additionally, the handle part for opening the motor vehicle lock or for moving the door into the open position is adjustable by the user or by a motor. Thus, for example, an adjustable handle part which, relative to the outwardly facing side of the door outer skin is able to be extended by motor from a retracted position or a position flush with the door outer skin into a protruding position, is conceivable.

As mentioned above, however, the handle part may also already constitute the extension functional component. Other extension functional components, such as a sensor device or the like, may also be mounted within the scope of the proposed solution. The embodiments of the door handle unit or the handle part and/or handle mount thus correspondingly also apply to other extension functional components.

For the purpose of mounting, a fastening part, such as a fastening slide, may be provided on the handle mount, the handle part being connected thereto. As an example, the mounting movement may be introduced into the fastening part, such as by means of a tool, for example a screwdriver, the mounting movement generating the contacting. The mounting movement causes the fastening part to move with an engagement element of the handle part which has been previously brought into the movement range of the fastening part by means of a previous mounting movement. By the engagement element being entrained by the fastening part, the handle part may also pretensioned with the handle mount and thereby fixed in the intended final position. This has the advantage that the handle part may be mounted by two successive mounting movements, such as in different mounting directions. In a mounting movement in a first mounting direction, the handle part is initially, for example manually, brought together with the fastening part and, in particular, the handle mount, whereupon then in a further mounting movement, in particular in a second mounting direction, which is at an angle to the first mounting direction, the final fastening, i.e. the fixing, of the handle part to the handle mount and also the final electrical contacting takes place.

In one or more embodiments, a bracing may be generated between the extension functional component and the mounting module, such as between the handle part and handle mount, in the first mounting direction by the further mounting movement and specify the further mounting movement.

The first mounting movement which is carried out, for example, manually and the further mounting movement for fastening the handle part to the mounting module.

According to another embodiment, a mounting module system with a proposed mounting module is provided. The extension functional component is fastened to the mounting module. In this case, a unit with a proposed mounting module and one or more extension functional components which may also be fastened to the mounting module after mounting the mounting module on the motor vehicle door, are denoted as the mounting module system. Thus in this regard, the motor vehicle door may be extended by at least one further functional component, the extension functional component. Reference should be made to all of the embodiments of the proposed mounting module.

According to another embodiment, which is also of independent importance, a motor vehicle door with a proposed mounting module and/or with a proposed mounting module system is claimed as such. Reference should be made to all of the embodiments of the proposed mounting module.

According to another embodiment, which also is of independent importance, a method for mounting a proposed mounting module system on a motor vehicle door is claimed as such. Reference should be made to all of the embodiments of the proposed mounting module.

It is essential in the proposed method that, within the scope of mounting the extension functional component on the mounting module with a mounting movement introduced into the extension functional component, both the extension functional component is fastened to the mounting module via the mechanical interface and also the extension functional component is electrically contacted via the contact unit.

BRIEF DESCRIPTION OF THE DRAWINGS

Hereinafter the invention is described in more detail with reference to a drawing, showing merely one exemplary embodiment. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known mounting module is described in DE 10 2016 009 825 A1 includes a motor vehicle lock, a window guide rail and a window lifter component as well as a sensor device as body functional components. The mounting module carrier is fastened, together with the body functional components fastened thereto, within the scope of a final mounting on the motor vehicle door.

By the use of such a mounting module, the final mounting is significantly simplified relative to a separate mounting of the functional components on the motor vehicle door. However, there is further potential for optimization in the manufacture of the motor vehicle door.

Figure 1:
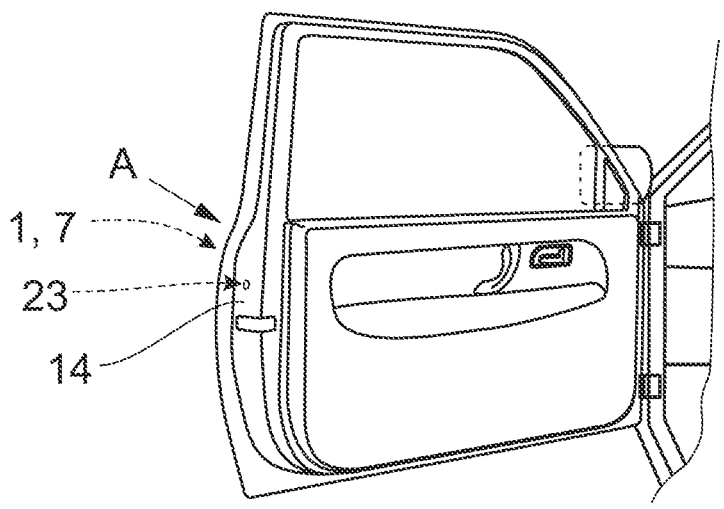
FIG. 1 shows a perspective view of a proposed motor vehicle door with a proposed mounting module system with a door handle unit which has a proposed mounting module.
Figure 1:
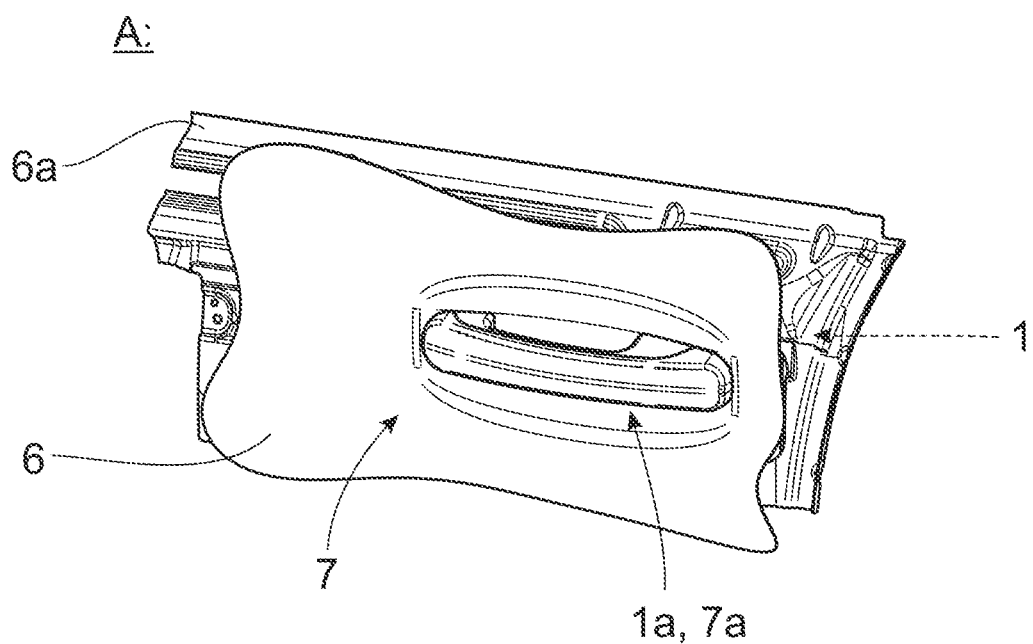
Figure 2:
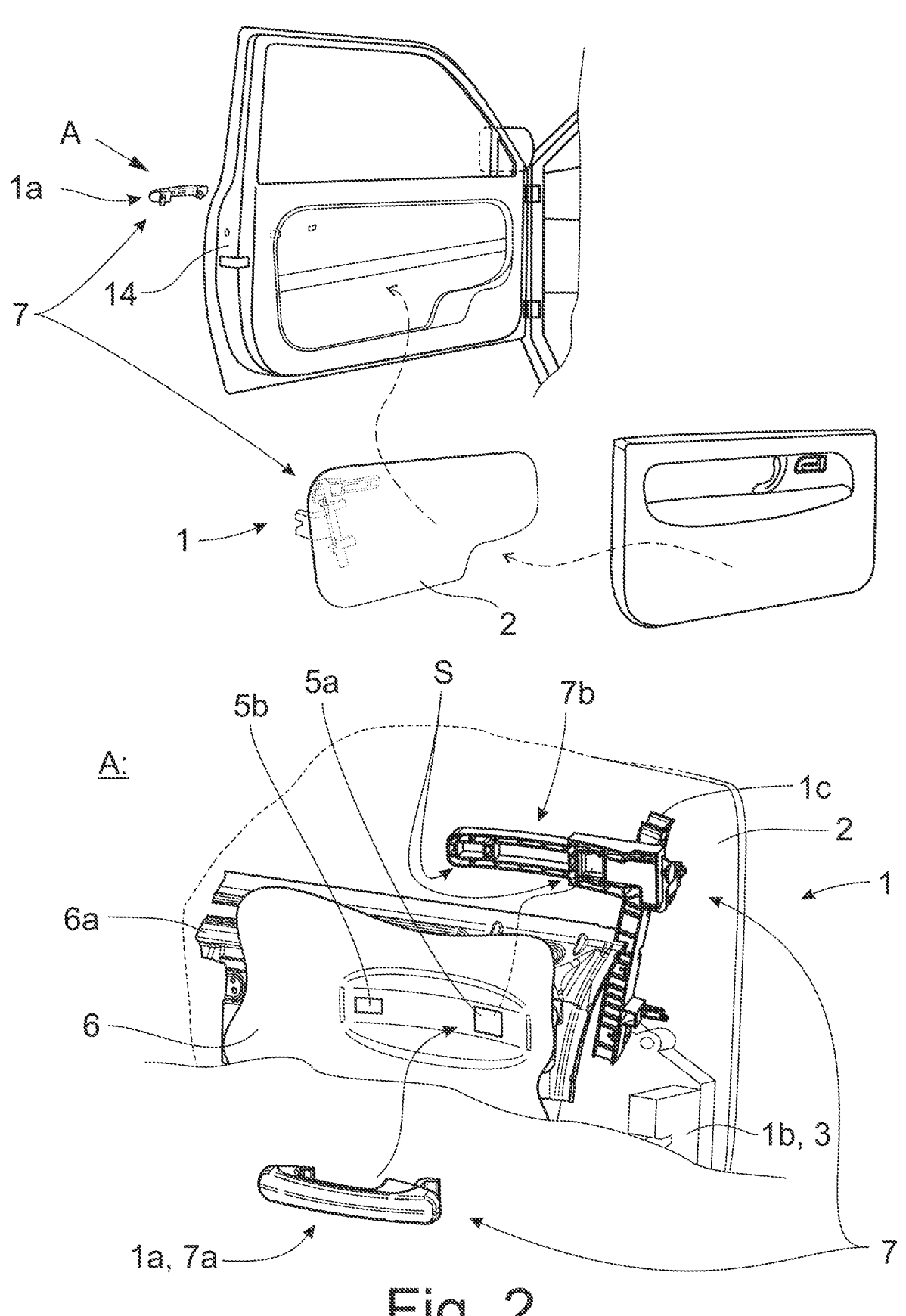
FIG. 2 shows the proposed motor vehicle door with the proposed mounting module system with the door handle unit in an exploded view.

The proposed mounting module system and the proposed mounting module 1 are assigned in each case to a motor vehicle door. The term "motor vehicle door" in the present case is to be understood broadly. It comprises side doors, rear doors, tail lids, tailgates, engine hoods, or the like. The motor vehicle door may be designed, as shown in FIG. 1, as a pivoting wing door which is pivotable via a hinge arrangement, or as a displaceable sliding door.

The proposed mounting module system may include a plurality of electrical and/or mechanical functional components 1a, 1b, 1c which are described in more detail hereinafter. The functional component 1a is an extension functional component which may be fastened to the proposed mounting module 1. The functional components 1b, 1c in this case are body functional components of the proposed mounting module 1. Furthermore, a mounting module carrier 2 is provided, the body functional components 1b, 1c having been fastened thereto within the scope of a pre-mounting.

A body functional component 1b is in this case a motor vehicle lock 3. Alternatively or additionally, a body functional component 1c may be, as in this case, a handle mount described in more detail below and/or a window guide rail and/or a moisture collection unit, in particular a moisture pan, and/or an edge protection unit and/or a window lifter component and/or a control device and/or a drive, in particular a door drive or the like. This functional component 1c is also fastened to the mounting module carrier 2 and is part of the mounting module 1.

The extension functional component 1a may be fastened to the proposed mounting module 1 after the body functional components 1b, 1c have been fastened within the scope of the pre-mounting on the mounting module carrier 2, and for example, within the scope of a final mounting, in this case after the mounting module 1 or the mounting module carrier 2 has already been mounted on the motor vehicle door. However, generally it is also conceivably the case that an extension functional component 1a is already fastened to the mounting module 1, in particular to the mounting module carrier 2, before the mounting module 1 is mounted on the motor vehicle door.

The term "pre-mounting" in this case means a fastening before the final fixing of the respective component in its intended final position. The "final mounting", which has the purpose of fixing the respective component in its intended final position, takes place after the pre-mounting, but may also comprise a step of a previous first fastening of the component before the final fixing. Accordingly, "pre-mounted" means that the respective component has been mounted within the scope of the pre-mounting and "final mounting" means that the respective component has been finally fixed within the scope of the final mounting, i.e. in its intended final position.

"Fastenable" or a "fastening" is to be understood to mean both the production of a rigid connection and also a loose connection which thus still has movement clearance. In this regard these terms are to be understood broadly.

The terms "fix" or "fixing" mean a fastening, in particular a rigid fastening, of the respective component in the intended final position thereof, for example of the extension functional component 1a on the mounting module 1, or of the mounting module 1 or mounting module carrier 2 on the motor vehicle door.

The "intended final position" is to be understood to mean the position in the final mounted state, i.e. after completing the motor vehicle door, wherein in this position in particular a rigid connection is present. For example, in this case there is a rigid connection between the extension functional component 1a and the mounting module 1 and between the mounting module carrier 2 and motor vehicle door if the extension functional component 1a or the mounting module carrier 2 is in the intended final position.

The extension functional component 1a which is shown in this case by way of example is a handle part 7a of a door handle unit 7. The embodiments relative to the door handle unit 7 or the handle part 7a, accordingly also apply to other extension functional components 1a. An example thereof is a sensor device for a motor vehicle door. However, it is also conceivable that the motor vehicle lock 3 and/or the handle mount 7b forms an extension functional component 1a, wherein the motor vehicle lock 3 or handle mount 7b in this case does not form a body functional component and correspondingly is not part of the mounting module 1. Such other extension functional components 1a may also be mounted in the manner described hereinafter.

The door handle unit 7 shown of the proposed mounting module system is able to be mounted on at least one handle recess 5a, 5b of the door outer skin 6. The door handle unit 7 has a handle mount 7b which in the final mounted state is arranged on the inwardly facing side of the door outer skin 6 or a door structural element 6a assigned to the door outer skin 6. The terms "inwardly" and "outwardly" are in this case always relative to the subsequent installed situation.

"Outwardly" thus means the subsequent vehicle outer side and door outer side. "Inwardly" correspondingly means the side located on the other side of the door outer skin 6. The handle mount 7 forms in this case one of the body functional components 1*b*, 1*c* and is arranged on the mounting module carrier 2, for example, as a separate component therefrom, but alternatively may also be provided by the mounting module carrier 2 and, such as, designed in one piece therewith.

Furthermore, the proposed door handle unit 7 has a handle part 7*a* which in this case by way of example forms the extension functional component 1*a*. The handle part 7*a* has a fixed or movable, for example extendable, in particular elongated handle portion which serves to be gripped by the hand of a user in the final mounted state. The handle part 7*a* in the final mounted state is coupled to the handle mount 7*b*, wherein the elongated handle portion of the handle part 7*a* in the final mounted state may protrude or may be extendable relative to the outwardly facing side of the door outer skin 6. If, as in this case, the door handle unit 7 is one with a fixed handle part 7*a* or handle portion, which is thus immovable in the final mounted state, the handle portion which may be gripped by the user may always protrudes relative to the door outer skin 6. In the case of an extendable handle part, the handle portion which may be gripped by the user protrudes in any case in the extended position, optionally also in the retracted position, relative to the door outer skin 6.

It is thus essential that the mounting module 1 has a mechanical interface S for fastening an extension functional component 1*a*, in particular of a handle part 7*a* of a door handle unit 7 and/or a handle mount 7*b* of a door handle unit 7 and/or a motor vehicle lock 3 and/or a sensor device, that the mounting module 1 has a contact unit 4 for electrically contacting the respective extension functional component 1*a* and that within the scope of the mounting of the extension functional component 1*a* to the mounting module 1 by means of a mounting movement introduced into the extension functional component 1*a*, the extension functional component 1*a* is fastened to the mounting module 1 via the mechanical interface S and the extension functional component 1*a* is also electrically contacted via the contact unit 4.

In this case, as in the exemplary embodiment shown, it may be provided that the mechanical interface S, for example, also the contact unit 4, is provided by the handle mount 7*b* of the door handle unit 7. As an example, the extension functional component 1*a* is the handle part 7*a* of the door handle unit 7. Further, the handle mount 7*b* of the door handle unit 7 is a body functional component fastened to the mounting module carrier 2. However, as mentioned above according to a further embodiment not shown in this case, it is also conceivable that the mechanical interface S, in particular also the contact unit 4, is provided by the mounting module carrier 2, wherein the extension functional component 1*a* may be the handle mount 7*b* of the door handle unit 7.

In this case and for example, before mounting the mounting module carrier 2 on the motor vehicle door, at least one of the functional components, including the motor vehicle lock 3 as a body functional component 1*b*, and in this case may also be the window guide rail as a further body functional component 1*c* is fastened thereto within the scope of pre-mounting. The handle mount 7*b* for the handle part 7*a* of the door handle unit 7 may also be fastened within the scope of the pre-mounting as a body functional component to the mounting module carrier 2, provided it is not otherwise formed thereby. In this case, the window guide rail and the handle mount 7*b* are configured jointly in one piece.

In this case, the body functional components 1*b*, 1*c*, in this case the motor vehicle lock 3, the window guide rail and also the handle mount 7*b*, are already fastened to the mounting module carrier 2 before this is joined to the motor vehicle door within the scope of the pre-mounting. This fastening leads, in particular, to a rigid connection. In this case, preferably the extension functional component 1*a*, in this case the handle part 7*a* of the door handle unit 7, at this time is not yet connected to the mounting module 1.

If the extension functional component 1*a*, in this case the handle part 7*a* of the door handle unit 7, has not yet been fastened to the mounting module 1 and, in particular, to the handle mount 7*b*, before the mounting module carrier 2 has been joined to the motor vehicle door, this extension functional component 1*a* may then be connected to the mounting module 1 and, in particular, the handle mount 7*b*. This may take place initially as a loose connection so that further movement clearance between the mounting module 1 and the extension functional component 1*a* and/or motor vehicle door is present and the mounting module 1, as an example, is not yet in its intended final position.

The final fixing and, for example, rigid fastening of the extension functional component 1*a* to the mounting module 1 and in this case also the mounting module 1 to the motor vehicle door takes place first within the scope of the final mounting by the mounting movement introduced into the extension functional component 1*a*. Since this mounting movement may be divided into two, as will be described further hereinafter, the fixing of the extension functional component 1*a* to the mounting module 1 and/or the mounting module 1 to the motor vehicle door, may also only take place by a part of the mounting movement, in particular the last part of the mounting movement.

In this case, by means of the mounting movement introduced into the extension functional component 1*a*, the handle part 7*a*, the extension functional component 1*a* adopts its intended final position relative to the mounting module 1 and, for example, also the motor vehicle door. Additionally, it is also provided as mentioned above that by means of the same mounting movement introduced into the extension functional component 1*a*, in this case the handle part 7*a*, the final electrical contacting is made, the contacting is thus brought into its intended final state. As an example, this mounting movement which generates the contacting may be preceded by a further mounting movement, which in this case and serves only for the, in particular still loose, fastening of the handle part 7*a* to the handle mount 7*b* but not for generating the electrical contacting.

Alternatively, however, already in this preceding mounting movement, in which the, in particular still loose, fastening of the handle part 7*a* to the handle mount 7*b* takes place, the extension functional component 1*a* may be electrically contacted, and namely in the form of an electrical pre-contacting, by the contact unit 4.

The term "pre-contacting" means that a contacting is not yet made via all of the contacts of the extension functional component 1*a* and contact unit 4 assigned to one another and/or a contacting has not yet been made with the final contact pressure between the contacts of the extension functional component 1*a* and the contact unit 4 assigned to one another. From this pre-contacted state, the electrical contacting may then be brought into its intended final state (operating state).

The door handle unit 7 is described further hereinafter. In this case, a fastening part 9 which is mounted so as to be able to be shifted, in particular displaced, on the handle mount 7*b* is provided in the door handle unit 7. The fastening part 9 serves to fix the handle part 7*a* to the handle mount 7*b* by adjusting the fastening part 9 between the initial position shown in FIG. 4*a*) and the intended final position shown in FIG. 4*b*), as is described hereinafter in more detail.

It is also the case here that the handle part 7*a* has at least one engagement element 10, 11, in this case two engagement elements 10, 11, and that for mounting the door handle unit 7 in a mounting movement in a first mounting direction Y the respective engagement element 10, 11 is able to be guided through one respectively assigned engagement element recess 12*a*, 12*b* of the handle mount 7*b*. This mounting movement in the first mounting direction Y may be identified when viewing FIGS. 3*a*) to *c*) and 4*a*) together.

Moreover, it is provided in the exemplary embodiment shown that for mounting the door handle unit 7, i.e. after completing or in any case after beginning the mounting movement in the first mounting direction Y, a further mounting movement, in this case in a second mounting direction X, may be subsequently introduced into the fastening part 9, in particular by means of a tool 13. This takes place, in particular, from a narrow side 14 of the motor vehicle door. The mounting movement in the second mounting direction X may be identified when viewing FIGS. 4*a*) and *b*) together. In this case, the fastening part 9 is moved from the initial position shown in FIG. 4*a*) into the final position shown in FIG. 4*b*).

In the exemplary embodiment shown here, after the start of the mounting movement in the first mounting direction Y, a further mounting movement, in this case and in the second mounting direction X, is that mounting movement which as proposed is introduced into the extension functional component 1*a* within the scope of mounting the extension functional component 1*a* on the mounting module 1, and is associated both with the fastening of the extension functional component 1*a* to the mounting module 1 via the mechanical interface S and the electrical contacting of the extension functional component 1*a* via the contact unit 4.

It is noteworthy here that with the further mounting movement, in this case in the second mounting direction X, the fastening part 9 entrains the engagement element 10 or one of the engagement elements 10, 11, in this case correspondingly in the second mounting direction X, and brings the engagement element into engagement with an assigned counter engagement element 15 of the handle mount 7*b*, such that by the further mounting movement a bracing of the handle part 7*a* with the handle mount 7*b* in the first mounting direction Y is generated. In this case, it is the case that the fastening part 9 comes directly into contact with the one engagement element 10 and in this case entrains this engagement element, in this case in the second mounting direction X, wherein the further engagement element 11 which in this case is spaced apart from the first engagement element 10 in the second mounting direction X, is also entrained by the fastening part 9. Correspondingly, in this case the one engagement element 10 comes into engagement with the counter engagement element 15 assigned thereto and the further engagement element 11 comes into engagement with the counter engagement element 16 assigned thereto, so that the bracing of the handle part 7*a* with the handle mount 7*b* is generated. However, it is also quite generally conceivable that only a single engagement element is provided, the single engagement element being correspondingly brought into engagement via the fastening part 9 with an assigned counter engagement element in order to generate the bracing.

The contact unit 4 of the mounting module carrier 2 may be arranged on the handle mount 7*b*, in this case on the counter engagement element 15 or alternatively on the fastening part 9. In the further mounting movement, if no pre-contacting were to be present, a contacting between electrical contacts 17 on the handle part 7*a*, in particular on the engagement element 10 or one of the engagement elements 10, 11 and the respectively assigned electrical contacts 18 on the contact unit 4, in this case on the handle mount 7*b*, is generated at the same time and thereby the contacting is brought into its intended final state. If a pre-contacting were already present, however, the contacting between the electrical contacts 17 on the handle part 7*a*, in particular on the engagement element 10 or on one of the engagement elements 10, 11 and the respectively assigned electrical contacts 18 on the contact unit 4, in this case on the handle mount 7*b*, is brought into its intended final state and further optimized thereby.

The electrical contacts 17 on the handle part 7*a* and/or the electrical contacts 18 on the handle mount 7*b* are, in particular, spring contacts.

In the door handle unit 7, shown by way of example in the figures, it is the case that the mounting movement which generates the bracing of the handle part 7*a* with the handle mount 7*b* in the first mounting direction Y at the same time also generates the first electrical contacting, by which the intended final state is also generated. Thus in this case at least one electrical component 19, 20, such as lighting, a sensor or the like is integrated in the handle part 7*a*, in particular in the protruding or extendable handle portion of the handle part 7*a* which may be gripped by the user. The described contacting serves for the electrical connection of these components 19, 20 with a vehicle electronics system (not shown). As an example, the at least one electrical component 19, 20 in this case is connected to at least one of the contacts 17 of the handle part 7*a*. The electrical connection is implemented in this case by strip conductors (shown in dotted lines). As in particular FIG. 3*c*) shows, in which for reasons of clarity the handle mount 7*b* is shown without the window guide rail, corresponding strip conductors also extend from the contacts 19 on the handle mount 7*b* and lead, in particular, to an electrical terminal and/or cable which may be connected or is connected to an on-board electrical system on the motor vehicle side.

As may be identified in particular in FIG. 3*a*) in the perspective view of the handle part 7*a*, in this case and a sealing element 21, such as in the form of a resilient bead, is arranged around the electrical contacts 17 of the handle part 7*a*. Additionally or alternatively, in this case a sealing element 21, also in the form of a resilient bead, may be arranged around the electrical contacts 18 of the contact unit 4. In this case, the sealing element 21 may be arranged such that it surrounds the entire region of the contacting, i.e. all of the electrical contacts 17 or all of the electrical contacts 18. In principle, however, it is also conceivable that each individual contact 17 or 18 is surrounded by a dedicated sealing element. In this case by the mounting movement introduced into the extension functional component 1*a*, in this case the further mounting movement in the second mounting direction X, the sealing element 21 is compressed and/or a seal the region of the contacting, such as against moisture, is generated.

In this case it also the case that by the further mounting movement, in this case in the second mounting direction X, a movement clearance, i.e. a mechanical clearance, between the extension functional component 1*a* and the mounting module 1, in this case between handle part 7*a* and handle mount 7b, is removed. Such a movement clearance may result from deviations due to tolerances, in particular when the handle mount 7b and handle part 7a are designed from different materials, in particular different plastics. In this case, it may be provided that with the further mounting movement within the scope of a first mounting step, in this case in the second mounting direction X, the handle part 7a is connected to the handle mount 7b with the provision of movement clearance. In this connection, in particular, a pre-contacting is already generated between the electrical contacts 17 on the handle part 7a and the electrical contacts 18 on the handle mount 7b or, if provided, on the fastening part 9. Within the scope of a second mounting step with the further mounting movement, in this case in the second mounting direction X, then the bracing between the handle part 7a and the handle mount 7b is generated in the first mounting direction Y and the movement clearance between the handle part 7a and the handle mount 7b is removed. In this case, the further mounting movement, in this case in the second mounting direction X, is thus divided into two, and thus comprises a partial movement within the scope of the first mounting step and a following partial movement within the scope of the second mounting step. In this case, it is also conceivable to perform the first mounting step chronologically spaced apart from the second mounting step. This may be the case, for example, when according to one embodiment, not shown in this case, the handle part 7a is initially preconnected to the handle mount 7b and namely within the scope of the mounting movement in the first mounting direction Y and within the scope of the first partial movement during the first mounting step, and then the unit thus generated with the handle part 7a and handle mount 7b, optionally with additional components, is fixed to the motor vehicle door within the scope of the further partial movement during the second mounting step. In this case, however, it is the case that the further mounting movement is a continuous, i.e. a single movement.

As may be identified in FIG. 3b) a lead-in chamfer 22 and/or a rounding is configured on the counter engagement element 15, along which a limb 10a of the engagement element 10 is guidable during the mounting movement in the second mounting direction X. The provision of such a lead-in chamfer 22 and/or rounding facilitates the removal of movement clearance. As an example, the lead-in chamfer 22 extends in a plane which runs at an angle to the second mounting direction X, in particular at a shallow angle to the second mounting direction X. Additionally or alternatively, as mentioned, a rounding may also be provided, wherein then the rounding extends radially around a geometric rounding axis, which runs at right-angles to the second mounting direction X and, in particular, parallel to the first mounting direction Y. The limb 10a of the engagement element 10, which may be guided along the lead-in chamfer 22 and/or rounding, runs in this case and in the mounted state parallel or at an angle to the second mounting direction X, such as at a shallow angle to the second mounting direction X. Additionally or alternatively, it is provided that the limb 10a of the engagement element 10 bears flat against an inwardly facing side of the counter engagement element 15.

In the case of the further mounting movement which may be introduced into the fastening part 9, here in the second mounting direction X, in this case it is a linear movement, in particular parallel or at an angle, preferably at a shallow angle, to the outer face of the motor vehicle door or door outer skin 6.

The resulting movement of the handle part 7a may be oriented in the same direction and may also be a movement in the second mounting direction X. In principle, the movement of the handle part 7a resulting from the further mounting movement, in this case in the second mounting direction X, however, may also be a pivoting movement B or a combination of a pivoting movement B and a linear movement or as in this case a sequence of individual movements, in particular a pivoting movement B followed by a linear movement. The respective linear movement thus also runs, for example, parallel or at an angle, such as at a shallow angle, to the outer face of the motor vehicle door or door outer skin 6.

Thus it may be identified in FIG. 4a) that the handle portion of the handle part 7a which may be gripped by the user already bears on the right-hand side against the door outer skin 6, whereas on the left-hand side a gap is still present. If the further mounting movement is performed, in this case in the second mounting direction X, the handle part 7a pivots in this case counterclockwise, until the gap is closed between the handle portion of the handle part 7a, which is able to be gripped by the user, and the door outer skin 6 as shown in FIG. 4b). At the same time the handle part 7a, as may be identified when viewing FIGS. 4a) and b) together, is moved further to the left, i.e. the engagement elements 10, 11 are moved toward the assigned counter engagement elements 15, 16 and then enclose these counter engagement elements in the final position shown in FIG. 4b) such that counter to the first mounting direction Y a positive connection is generated between the engagement elements 10, 11 and the counter engagement elements 15, 16 and the bracing of the handle part 7a with the handle mount 7b is generated.

With the mounting movement in the first mounting direction Y, the respective engagement element 10, 11 is guided in this case and from outside through a respectively assigned handle recess 5a, 5b of the door outer skin 6. In this case, the engagement element 10 is guided through the handle recess 5a and the engagement element 11 is guided through the handle recess 5b. In this case and preferably it is also the case that during the mounting movement in the first mounting direction Y, the respective handle engagement element 10, 11 is subsequently guided through the respectively assigned engagement element recess 12a, 12b. In this case, the engagement element 10 is guided through the engagement element recess 12 and the engagement element 11 is guided through the engagement element recess 12a, 12b.

As an example, in the mounted state the door outer skin 6 runs between the handle mount 7b and the handle portion of the handle part 7a which may be gripped by the user.

Alternatively or additionally, the mounting movement introduced in the extension functional component 1a within the scope of the mounting of the extension functional component 1a on the mounting module 1, in this case corresponding to the mounting movement of the respective engagement element 10, 11 in the first mounting direction Y, is a linear movement, in particular at right-angles or at an angle, such as at an acute angle, to the outer face of the motor vehicle door or door outer skin 6.

The mounting movement in the first mounting direction Y runs, in particular, at right-angles or at an angle, such as at an acute angle, to the mounting movement in the second mounting direction X.

Figure 3:
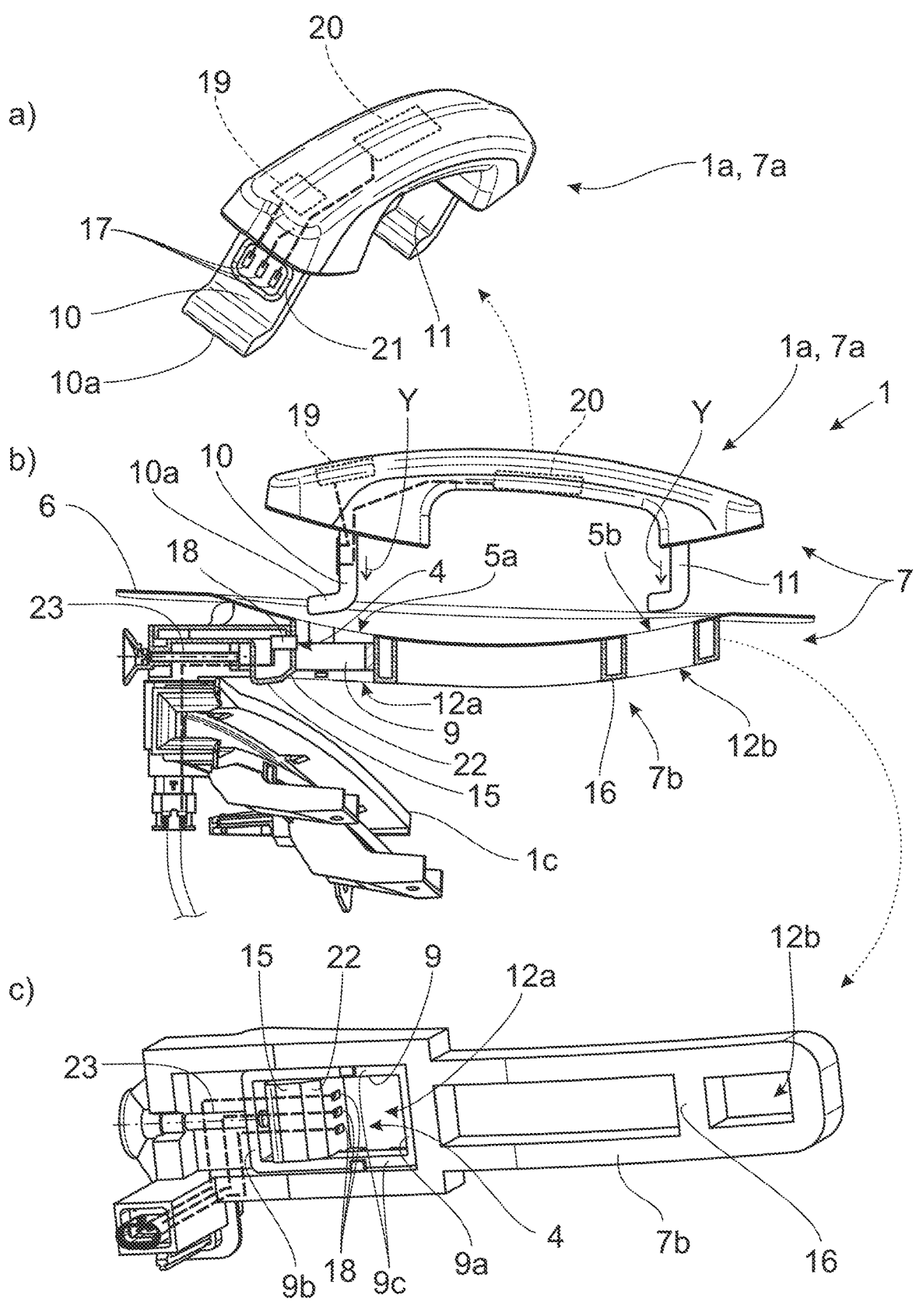
FIG. 3 shows a perspective and partially sectional view a) of the handle part of the door handle unit, b) of the entire door handle unit and c) of the handle mount of the door handle unit before mounting
Figure 4:
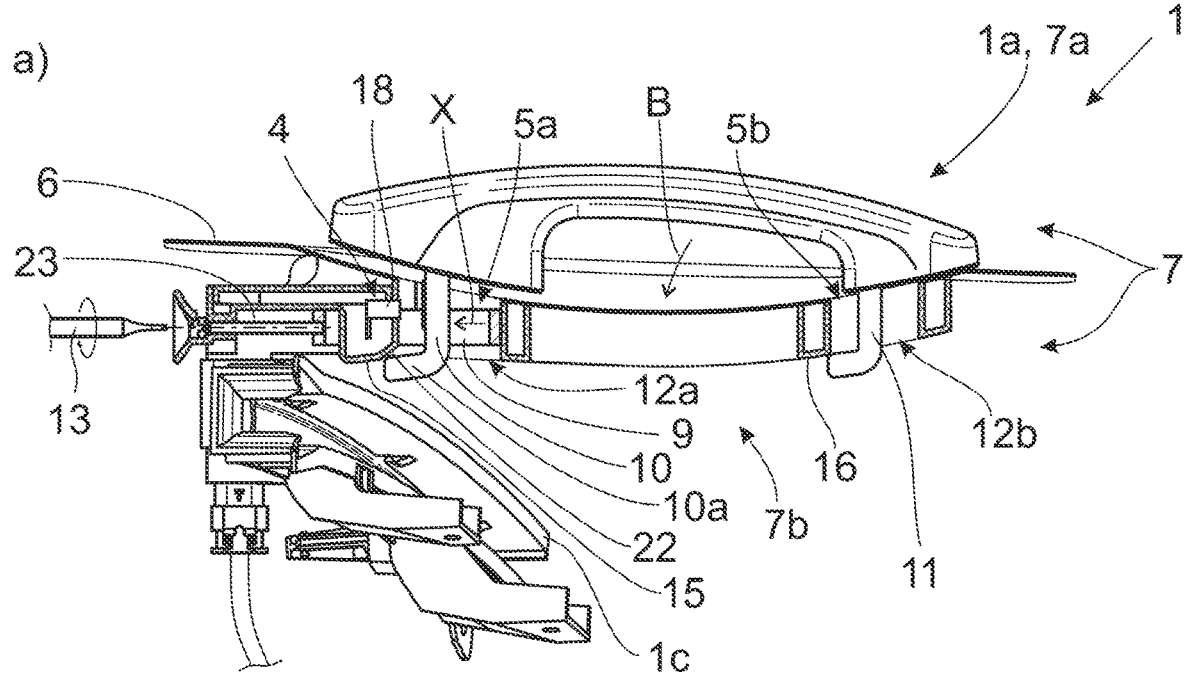
FIG. 4 shows a perspective and partially sectional view of the proposed mounting module system with the door handle unit a) after a mounting movement in a first mounting direction and b) after a further mounting movement in a subsequent second mounting direction.
Figure 4:
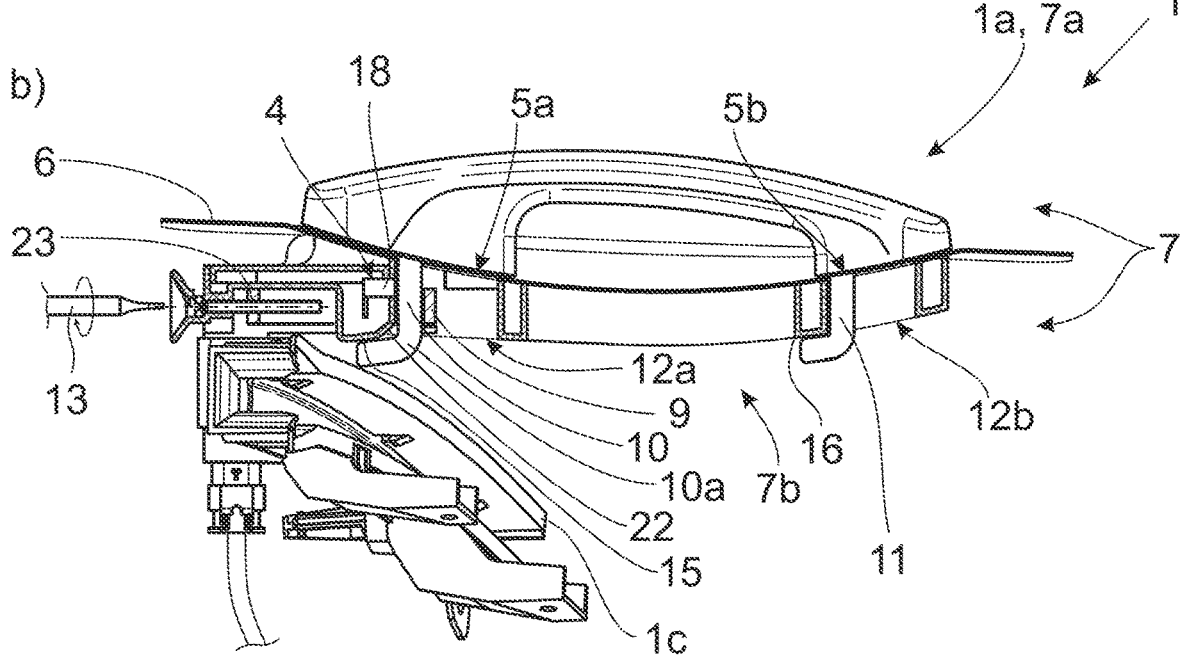

Hereinafter the mode of operation and the construction of the fastening part 9 shown in FIGS. 3 and 4, is to be described in more detail. Thus the further mounting movement, in this case in the second mounting direction X, is introduced into the fastening part 9 by means of the tool 13 via a screw element 23, in particular a single screw element 23. Said bracing of the handle part 7*a* with the handle mount 7*b* is generated by the screw element 23 being tightened. By the positive connection formed thereby between the engagement elements 10, 11 and the counter engagement elements 15, 16 counter to the first mounting direction Y, no forces are transmitted to the screw element 23 when the user pulls on the cited handle portion of the handle part 7*a*.

To this end, the fastening part 9 has in this case and as an example two fastening partial portions 9*a*, 9*b*, which are spaced apart from one another, in this case spaced apart from one another in the second mounting direction X, which are connected together via at least one connecting portion 9*c*. In this case a counter engagement element 15 of the handle mount 7*b*, such as the counter engagement element 15 with the lead-in chamfer 22 and/or rounding, is arranged between the first fastening partial portion 9*a* and the second fastening partial portion 9*b*. At the same time, in this case and preferably it is the case that with the further mounting movement the first fastening partial portion 9*a* entrains the engagement element 10 or one of the engagement elements 10, 11 in the direction of the further mounting movement, in this case in the second mounting direction X, and thus in the direction of the counter engagement element 15.

Additionally or alternatively, as in this case in the exemplary embodiment shown, it may be provided that the further mounting movement, in this case in the second mounting direction X, in particular may be introduced into the second fastening partial portion 9*b* via the screw element 23 and/or by means of the tool 13. The fastening part 9 at the same time, in this case and preferably is designed as a frame, such as, a fully peripheral frame. In principle, however, the fastening part 9 may also be designed in a different manner as long as it is ensured that the two fastening partial portions 9*a* and 9*b* are connected together.

It should also be mentioned that, as in the exemplary embodiment described in this case, initially only one or more of the body functional components 1*b*, 1*c*, in particular the motor vehicle lock 3 and/or the handle mount 7*b* is fastened to the fastening part 9 on the mounting module carrier 2, in this case displaceably mounted thereon. The handle part 7*a* forming the extension functional component 1*a* is not yet connected at this time to the handle mount 7*b*. In this case, only after the mounting module 1 has been connected to the motor vehicle door in the described manner is the handle part 7*a* then connected within the scope of the final mounting to the handle mount 7*b*, whereby the door handle unit 7 is then produced.

It is, however, also conceivable that already within the scope of the pre-mounting, the door handle unit 7 as described above is produced with the handle mount 7*b* forming a body functional component and the handle part 7*a* forming the extension functional component 1*a*, wherein in particular a bracing of the handle part 7*a* with the handle mount 7*b* is already generated in the first mounting direction Y. This door handle unit 7 is then fastened at this time to the mounting module carrier 2 with the body functional component 1*b* in the form of the motor vehicle lock 3 and in this case also the further body functional component(s) 1*b*, 1*c*. Such a mounting module 1, on which the extension functional component 1*a* in the form of the handle part 7*a* is already fastened, is only then connected to the motor vehicle door.

It is also the case, that the motor vehicle door has a wet-dry space separation which separates a wet space from a dry space. In the final mounted state (FIG. 1), the mounting module 1 thus closes an opening in the wet-dry space separation and/or forms the wet-dry space separation.

According to further teaching which is of independent importance, a mounting module system with a proposed mounting module 1 is claimed, wherein the extension functional component 1*a* is fastened to the mounting module 1 and this mounting module is fastened, in particular, to the motor vehicle door. Reference should be made to all of the embodiments of the proposed mounting module 1.

According to further teaching, which is also of independent importance, a motor vehicle door with a proposed mounting module 1 and/or with a proposed mounting module system is claimed as such. Reference should be made to all of the embodiments of the proposed mounting module 1 and the proposed mounting module system.

According to further teaching which is also of independent importance, a method for mounting a proposed mounting module system on a motor vehicle door is claimed. Reference should be made to all of the embodiments of the proposed mounting module 1 and proposed mounting module system.

It is essential in the proposed method that within the scope of the mounting of the extension functional component 1*a* on the mounting module 1, with a movement introduced into the extension functional component 1*a*, the extension functional component 1*a* is fastened to the mounting module 1 via the mechanical interface S and the extension functional component 1*a* is also electrically contacted via the contact unit 4.

In this case it is further provided that the door handle unit 7 is mounted on the at least one handle recess 5*a*, 5*b* of the door outer skin 6 of the motor vehicle door, wherein the handle part 7*a* may be coupled to the handle mount 7*b*, preferably that for mounting the door handle unit 7 the respective engagement element 10, 11 is guided in a mounting movement in a first mounting direction Y through a respectively assigned engagement element recess 12*a*, 12*b* of the handle mount 7*b*, further preferably that for mounting the door handle unit 7, a further mounting movement, in particular in a second mounting direction X, is subsequently introduced into the fastening part 9, in particular by means of a tool 13, wherein with the further mounting movement the fastening part 9 entrains the engagement element 10 or one of the engagement elements 10, 11 and brings the engagement element into engagement with the assigned counter engagement element 15 of the handle mount 7*b*, such that by the further mounting movement a bracing of the handle part 7*a* with the handle mount 7*b* is generated in the first mounting direction Y.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS 1 mounting module
2 mounting module carrier
3 motor vehicle lock
4 contact unit
6 door outer skin
7 door handle unit
9 fastening part
10 engagement element 11 engagement element
12 engagement element recess
13 tool
14 narrow side
15 counter engagement element
16 counter engagement element
17 electrical contacts
18 electrical contacts
19 contacts
1*a* extension functional components
1*b* body functional component
1*c* mechanical functional components
20 electrical component
21 sealing element
22 lead—in chamfer
23 screw element
23 single screw element
5*a* handle recess
5*b* handle recess
6*a* door structural element
7*a* handle part
9*a* first fastening partial portion
9*b* second fastening partial portion
9*c* one connecting portion
10*a* limb
12*a* respectively assigned engagement element recess
12*b* respectively assigned engagement element recess While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A mounting module configured to be mounted to a motor vehicle door, comprising:
a mounting module carrier;
a contact unit; and
at least one body functional component fastened to the mounting module carrier,
wherein the mounting module includes a mechanical interface for fastening an extension functional component,
wherein the contact unit is configured to electrically contact the extension functional component,
wherein by mounting the extension functional component to the mounting module, by means of a mounting movement introduced into the extension functional component, the extension functional component is fastened to the mounting module via the mechanical interface and the extension functional component is electrically connected to the mounting module via the contact unit,
wherein by the mounting movement which is introduced into the extension functional component, the extension functional component is fixed in an intended final position on the mounting module,
wherein, after a start of the mounting movement of the extension functional component in a first mounting direction, a further mounting movement of the extension functional component in a second mounting direction is introduced into the extension functional component which is associated both with the fastening of the extension functional component to the mounting module via the mechanical interface and the electrical contacting of the extension functional component via the contact unit, and
wherein by the further mounting movement of the extension functional component, a bracing of the extension functional component and the mounting module is generated.

2. The mounting module of claim 1, wherein the at least one body functional component includes a motor vehicle lock and the extension functional component is a handle part or a handle mount of a door handle unit, or a sensor device.

3. The mounting module of claim 2, wherein the mounting module carrier forms the mechanical interface.

4. The mounting module of claim 1, wherein the extension functional component includes a first number of electrical contacts and the contact unit a second number of electrical contacts, and the mounting movement generates an electrical contacting between the first number of electrical contacts and the second number of electrical contacts.

5. The mounting module of claim 1, further comprising:
a sealing element arranged around a first number of electrical contacts of the extension functional component and/or around a second number of electrical contacts of the contact unit.

6. The mounting module of claim 1, wherein by the further mounting movement, a movement clearance between the extension functional component and the mounting module and/or the mounting module carrier is removed.

7. A mounting module system comprising:
the mounting module of claim 1; and
the extension functional component;
wherein the extension functional component is fastened to the mounting module.

8. A motor vehicle door comprising the mounting module of claim 1 or the mounting module system of claim 7.

9. A method of mounting the mounting module system of claim 7 to the motor vehicle door, the method comprising:
executing a first mounting movement in the first mounting direction and the further mounting movement in the second mounting direction by moving the extension functional component relative to the mounting module configured to be mounted to the motor vehicle door;
wherein, after starting of the mounting movement in the first mounting direction,
the extension functional component is fastened to the mounting module by the further mounting movement via the mechanical interface formed by the mounting module carrier;
the extension functional component is electrically contacted to the mounting module via the contact unit in the further mounting movement; and
wherein by the further mounting movement of the extension functional component the bracing of the extension functional component and the mounting module is generated.

10. The method of claim 9, further comprising:
mounting a door handle unit to at least one handle recess defined by a door outer skin of the motor vehicle door, wherein the door handle unit includes a handle part coupled to a handle mount.

11. The mounting module of claim 1, wherein the at least one body functional component includes a handle mount of a door handle unit and the extension functional component is a handle part of the door handle unit.

12. The mounting module of claim 11, wherein the handle mount forms the mechanical interface.

13. The mounting module of claim 11, wherein the door handle unit is configured to be mounted on at least one handle recess defined by a door outer skin of the motor vehicle door, and wherein the handle mount, in a mounted state, is arranged on an inwardly facing side of the door outer skin or a door structural element assigned to the door outer skin.

14. The mounting module of claim 11, wherein the door handle unit includes a fastening part mounted so as to be able to be shifted on the handle mount, wherein the handle part includes at least one engagement element, wherein for mounting the door handle unit during the mounting movement in the first mounting direction the at least one engagement element is guided through an engagement element recess of the handle mount.

15. The mounting module of claim 14, wherein for mounting the door handle unit, the further mounting movement is subsequently introduced to the fastening part so that the fastening part entrains the at least one engagement element and brings the engagement element into engagement with an assigned counter engagement element of the handle mount.

16. The mounting module of claim 15, wherein the counter engagement element includes a lead-in chamfer and/or a radius, wherein a limb of the engagement element is configured to be guided along the lead-in chamfer and/or the radius during the further mounting movement.

17. The mounting module of claim 14, wherein with the mounting movement in the first mounting direction, the at least on engagement element is configured to be guided from an outer side of a door outer skin through a handle recess defined by the door outer skin.

18. The mounting module of claim 14, wherein the mounting movement of the respective engagement element in the first mounting direction is a linear movement.

19. The mounting module of claim 14, wherein the fastening part includes two fastening partial portions spaced apart from one another, wherein the two fastening partial portions are connected together via at least one connecting portion.

20. The mounting module of claim 11, wherein the handle mount forms the contact unit.

21. The mounting module of claim 1, wherein the at least one body functional component includes a window guide rail, a moisture collection unit, a moisture pan, an edge protection unit, a window lifter component, a control device, a drive, or a door drive and the extension functional component is a handle part or a handle mount of a door handle unit, a motor vehicle lock, or a sensor device.

\* \* \* \* \*